(12) United States Patent
Newton (10) Patent No.: US 8,384,693 B2
(45) Date of Patent: Feb. 26, 2013

(54) LOW PROFILE TOUCH PANEL SYSTEMS

(75) Inventor: John Newton, Auckland (NZ)

(73) Assignee: Next Holdings Limited (NZ)

( * ) Notice: Subject to any disclaimer, the term of this patent is extended or adjusted under 35 U.S.C. 154(b) by 1047 days.

(21) Appl. No.: 12/201,410

(22) Filed: Aug. 29, 2008

(65) Prior Publication Data

US 2009/0058832 A1    Mar. 5, 2009

(30) Foreign Application Priority Data

Aug. 30, 2007 (NZ) ........................................ 561038

(51) Int. Cl.
*G06F 3/042* (2006.01)
(52) U.S. Cl. ..................................... 345/175; 178/18.09
(58) Field of Classification Search .......... 345/173–178; 178/18.01–19.07
See application file for complete search history.

(56) References Cited

U.S. PATENT DOCUMENTS

| | | |
|---|---|---|
| 844,152 A | 2/1907 | Little |
| 2,407,680 A | 9/1946 | Palmquist et al. |
| 2,769,374 A | 11/1956 | Sick |
| 3,025,406 A | 3/1962 | Stewart et al. |
| 3,128,340 A | 4/1964 | Harmon |
| 3,187,185 A | 6/1965 | Milnes |
| 3,360,654 A | 12/1967 | Muller |
| 3,478,220 A | 11/1969 | Milroy |
| 3,563,771 A | 2/1971 | Tung |
| 3,613,066 A | 10/1971 | Cooreman |
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |
| 3,860,754 A | 1/1975 | Johnson et al. |
| 4,107,522 A | 8/1978 | Walter |

(Continued)

FOREIGN PATENT DOCUMENTS

| | | |
|---|---|---|
| AU | 7225001 | 1/2002 |
| AU | 2003233728 | 12/2003 |

(Continued)

OTHER PUBLICATIONS

"International Application Serial No. PCT/US2008/074749, Search Report & Written Opinion mailed Feb. 11, 2009", 48 pgs.

(Continued)

*Primary Examiner* — Michael Pervan
(74) *Attorney, Agent, or Firm* — Kilpatrick Townsend & Stockton LLP (57) ABSTRACT

A low profile touch display can be provided, namely one including an optical detection system with the bulk of the electronics and optics positioned partially or completely below the detecting plane surface. The light source and optical detection system components can be configured so that the exit and entry apertures for light being directed to and/or received from the detection plane are the only members above the touch surface. For instance, a reflective or refractive member at the edge of the touch surface can direct light to detection optics and/or from illumination sources via a pinhole aperture, with the light moving between the detection optics and illumination sources in one or more detection planes above the touch surface. Consequently, the touch screen can have a thin cross section that is more suitable for devices such as mobile phones, PDAs, and other portable computing devices for which minimal device thickness is a priority.

20 Claims, 4 Drawing Sheets

U.S. PATENT DOCUMENTS

| | | | |
|---|---|---|---|
| 4,144,449 A | 3/1979 | Funk et al. | |
| 4,243,618 A | 1/1981 | Van Arnam | |
| 4,243,879 A | 1/1981 | Carroll et al. | |
| 4,247,767 A | 1/1981 | O'Brien et al. | |
| 4,329,037 A | 5/1982 | Caviness | |
| 4,420,261 A | 12/1983 | Barlow et al. | |
| 4,459,476 A | 7/1984 | Weissmueller et al. | |
| 4,468,694 A | 8/1984 | Edgar | |
| 4,486,363 A | 12/1984 | Pricone et al. | |
| 4,507,557 A | 3/1985 | Tsikos | |
| 4,542,375 A | 9/1985 | Alles et al. | |
| 4,550,250 A | 10/1985 | Mueller et al. | |
| 4,553,842 A | 11/1985 | Griffin | |
| 4,558,313 A | 12/1985 | Garwin et al. | |
| 4,601,861 A | 7/1986 | Pricone et al. | |
| 4,672,364 A | 6/1987 | Lucas | |
| 4,673,918 A | 6/1987 | Adler et al. | |
| 4,688,933 A | 8/1987 | Lapeyre | |
| 4,703,316 A | 10/1987 | Sherbeck | |
| 4,710,760 A | 12/1987 | Kasday | |
| 4,737,631 A | 4/1988 | Sasaki et al. | |
| 4,742,221 A | 5/1988 | Sasaki et al. | |
| 4,746,770 A | 5/1988 | McAvinney | |
| 4,762,990 A | 8/1988 | Caswell et al. | |
| 4,766,424 A | 8/1988 | Adler et al. | |
| 4,782,328 A | 11/1988 | Denlinger | |
| 4,811,004 A | 3/1989 | Person et al. | |
| 4,818,826 A | 4/1989 | Kimura | |
| 4,820,050 A | 4/1989 | Griffin | |
| 4,822,145 A | 4/1989 | Staelin | |
| 4,831,455 A | 5/1989 | Ishikawa et al. | |
| 4,851,664 A | 7/1989 | Rieger | |
| 4,868,551 A | 9/1989 | Arditty et al. | |
| 4,868,912 A | 9/1989 | Doering | |
| 4,888,479 A | 12/1989 | Tamaru | |
| 4,893,120 A | 1/1990 | Doering et al. | |
| 4,916,308 A | 4/1990 | Meadows | |
| 4,928,094 A | 5/1990 | Smith | |
| 4,943,806 A | 7/1990 | Masters et al. | |
| 4,980,547 A | 12/1990 | Griffin | |
| 4,990,901 A | 2/1991 | Beiswenger | |
| 5,025,314 A | 6/1991 | Tang et al. | |
| 5,025,411 A | 6/1991 | Tallman et al. | |
| 5,043,751 A | 8/1991 | Rice | |
| 5,097,516 A | 3/1992 | Amir | |
| 5,103,085 A | 4/1992 | Zimmerman | |
| 5,103,249 A | 4/1992 | Keene | |
| 5,105,186 A | 4/1992 | May | |
| 5,109,435 A | 4/1992 | Lo et al. | |
| 5,130,794 A | 7/1992 | Ritchey | |
| 5,140,647 A | 8/1992 | Ise et al. | |
| 5,148,015 A | 9/1992 | Dolan | |
| 5,162,618 A | 11/1992 | Knowles | |
| 5,162,783 A | 11/1992 | Moreno | |
| 5,164,714 A | 11/1992 | Wehrer | |
| 5,168,531 A | 12/1992 | Sigel | |
| 5,177,328 A | 1/1993 | Ito et al. | |
| 5,179,369 A | 1/1993 | Person et al. | |
| 5,196,835 A | 3/1993 | Blue et al. | |
| 5,196,836 A | 3/1993 | Williams | |
| 5,200,851 A | 4/1993 | Coderre et al. | |
| 5,200,861 A | 4/1993 | Moskovich | |
| 5,233,502 A | 8/1993 | Beatty et al. | |
| 5,239,152 A | 8/1993 | Caldwell et al. | |
| 5,239,373 A | 8/1993 | Tang et al. | |
| 5,272,470 A | 12/1993 | Zetts | |
| 5,317,140 A | 5/1994 | Dunthorn | |
| 5,359,155 A | 10/1994 | Helser | |
| 5,374,971 A | 12/1994 | Clapp et al. | |
| 5,414,413 A | 5/1995 | Tamaru et al. | |
| 5,422,494 A | 6/1995 | West et al. | |
| 5,448,263 A | 9/1995 | Martin | |
| 5,457,289 A | 10/1995 | Huang et al. | |
| 5,483,261 A | 1/1996 | Yasutake | |
| 5,483,603 A | 1/1996 | Luke et al. | |
| 5,484,966 A | 1/1996 | Segen | |
| 5,490,655 A | 2/1996 | Bates | |
| 5,502,568 A | 3/1996 | Ogawa et al. | |
| 5,525,764 A | 6/1996 | Junkins et al. | |
| 5,528,263 A | 6/1996 | Platzker et al. | |
| 5,528,290 A | 6/1996 | Saund | |
| 5,537,107 A | 7/1996 | Funado | |
| 5,541,372 A | 7/1996 | Baller et al. | |
| 5,554,828 A | 9/1996 | Primm | |
| 5,581,276 A | 12/1996 | Cipolla et al. | |
| 5,581,637 A | 12/1996 | Cass et al. | |
| 5,591,945 A | 1/1997 | Kent | |
| 5,594,469 A | 1/1997 | Freeman et al. | |
| 5,594,502 A | 1/1997 | Bito et al. | |
| 5,617,312 A | 4/1997 | Iura et al. | |
| 5,638,092 A | 6/1997 | Eng et al. | |
| 5,670,755 A | 9/1997 | Kwon | |
| 5,686,942 A | 11/1997 | Ball | |
| 5,698,845 A | 12/1997 | Kodama et al. | |
| 5,712,024 A | 1/1998 | Okuzaki et al. | |
| 5,729,704 A | 3/1998 | Stone et al. | |
| 5,734,375 A | 3/1998 | Knox et al. | |
| 5,736,686 A | 4/1998 | Perret, Jr. et al. | |
| 5,737,740 A | 4/1998 | Henderson et al. | |
| 5,739,479 A | 4/1998 | Davis-Cannon et al. | |
| 5,745,116 A | 4/1998 | Pisutha-Arnond | |
| 5,764,223 A | 6/1998 | Chang et al. | |
| 5,771,039 A | 6/1998 | Ditzik | |
| 5,784,054 A | 7/1998 | Armstrong et al. | |
| 5,785,439 A | 7/1998 | Bowen | |
| 5,786,810 A | 7/1998 | Knox et al. | |
| 5,790,910 A | 8/1998 | Haskin | |
| 5,801,704 A | 9/1998 | Oohara et al. | |
| 5,804,773 A | 9/1998 | Wilson et al. | |
| 5,818,421 A | 10/1998 | Ogino et al. | |
| 5,818,424 A | 10/1998 | Korth | |
| 5,819,201 A | 10/1998 | DeGraaf | |
| 5,825,352 A | 10/1998 | Bisset et al. | |
| 5,831,602 A | 11/1998 | Sato et al. | |
| 5,877,459 A | 3/1999 | Prater | |
| 5,909,210 A | 6/1999 | Knox et al. | |
| 5,911,004 A | 6/1999 | Ohuchi et al. | |
| 5,914,709 A | 6/1999 | Graham et al. | |
| 5,920,342 A | 7/1999 | Umeda et al. | |
| 5,936,615 A | 8/1999 | Waters | |
| 5,936,770 A | 8/1999 | Nestegard et al. | |
| 5,940,065 A | 8/1999 | Babb et al. | |
| 5,943,783 A | 8/1999 | Jackson | |
| 5,963,199 A | 10/1999 | Kato et al. | |
| 5,982,352 A | 11/1999 | Pryor | |
| 5,988,645 A | 11/1999 | Downing | |
| 5,990,874 A | 11/1999 | Tsumura et al. | |
| 6,002,808 A | 12/1999 | Freeman | |
| 6,008,798 A | 12/1999 | Mato, Jr. et al. | |
| 6,015,214 A | 1/2000 | Heenan et al. | |
| 6,020,878 A | 2/2000 | Robinson | |
| 6,031,524 A | 2/2000 | Kunert | |
| 6,031,531 A | 2/2000 | Kimble | |
| 6,061,177 A | 5/2000 | Fujimoto | |
| 6,067,080 A | 5/2000 | Holtzman | |
| 6,075,905 A | 6/2000 | Herman et al. | |
| 6,076,041 A | 6/2000 | Watanabe | |
| 6,091,406 A | 7/2000 | Kambara et al. | |
| 6,100,538 A | 8/2000 | Ogawa | |
| 6,104,387 A | 8/2000 | Chery et al. | |
| 6,118,433 A | 9/2000 | Jenkin et al. | |
| 6,122,865 A | 9/2000 | Branc et al. | |
| 6,128,003 A | 10/2000 | Smith et al. | |
| 6,141,000 A | 10/2000 | Martin | |
| 6,147,678 A | 11/2000 | Kumar et al. | |
| 6,153,836 A | 11/2000 | Goszyk | |
| 6,161,066 A | 12/2000 | Wright et al. | |
| 6,179,426 B1 | 1/2001 | Rodriguez, Jr. et al. | |
| 6,188,388 B1 | 2/2001 | Arita et al. | |
| 6,191,773 B1 | 2/2001 | Maruno et al. | |
| 6,208,329 B1 | 3/2001 | Ballare | |
| 6,208,330 B1 | 3/2001 | Hasegawa et al. | |
| 6,209,266 B1 | 4/2001 | Branc et al. | |
| 6,215,477 B1 | 4/2001 | Morrison et al. | |
| 6,222,175 B1 | 4/2001 | Krymski | |
| 6,226,035 B1 | 5/2001 | Korein et al. | |
| 6,229,529 B1 | 5/2001 | Yano et al. | |

| | | | | | | |
|---|---|---|---|---|---|---|
| 6,252,989 B1 | 6/2001 | Geisler et al. | 6,738,051 B2 | 5/2004 | Boyd et al. | |
| 6,256,033 B1 | 7/2001 | Nguyen | 6,741,250 B1 | 5/2004 | Furlan et al. | |
| 6,262,718 B1 | 7/2001 | Findlay et al. | 6,741,267 B1 | 5/2004 | Van Ieperen | |
| 6,285,359 B1 | 9/2001 | Ogasawara et al. | 6,747,636 B2 | 6/2004 | Martin | |
| 6,310,610 B1 | 10/2001 | Beaton et al. | 6,756,910 B2 | 6/2004 | Ohba et al. | |
| 6,320,597 B1 | 11/2001 | Van Ieperen | 6,760,009 B2 | 7/2004 | Omura et al. | |
| 6,323,846 B1 | 11/2001 | Westerman et al. | 6,760,999 B2 | 7/2004 | Branc et al. | |
| 6,326,954 B1 | 12/2001 | Van Ieperen | 6,767,102 B1 | 7/2004 | Heenan et al. | |
| 6,328,270 B1 | 12/2001 | Elberbaum | 6,774,889 B1 | 8/2004 | Zhang et al. | |
| 6,335,724 B1 | 1/2002 | Takekawa et al. | 6,803,906 B1 | 10/2004 | Morrison et al. | |
| 6,337,681 B1 | 1/2002 | Martin | 6,828,959 B2 | 12/2004 | Takekawa et al. | |
| 6,339,748 B1 | 1/2002 | Hiramatsu | 6,864,882 B2 | 3/2005 | Newton | |
| 6,346,966 B1 | 2/2002 | Toh | 6,909,425 B2 | 6/2005 | Matsuda et al. | |
| 6,352,351 B1 | 3/2002 | Ogasahara et al. | 6,911,972 B2 | 6/2005 | Brinjes | |
| 6,353,434 B1 | 3/2002 | Akebi et al. | 6,919,880 B2 | 7/2005 | Morrison et al. | |
| 6,359,612 B1 | 3/2002 | Peter et al. | 6,927,384 B2 | 8/2005 | Reime et al. | |
| 6,362,468 B1 | 3/2002 | Murakami et al. | 6,933,981 B1 | 8/2005 | Kishida et al. | |
| 6,377,228 B1 | 4/2002 | Jenkin et al. | 6,947,029 B2 | 9/2005 | Katagiri et al. | |
| 6,384,743 B1 | 5/2002 | Vanderheiden | 6,947,032 B2 | 9/2005 | Morrison et al. | |
| 6,406,758 B1 | 6/2002 | Bottari et al. | 6,952,202 B2 | 10/2005 | Hirabayashi | |
| 6,414,671 B1 | 7/2002 | Gillespie et al. | 6,954,197 B2 | 10/2005 | Morrison et al. | |
| 6,414,673 B1 | 7/2002 | Wood et al. | 6,972,401 B2 | 12/2005 | Akitt et al. | |
| 6,421,042 B1 | 7/2002 | Omura et al. | 6,972,753 B1 | 12/2005 | Kimura et al. | |
| 6,427,389 B1 | 8/2002 | Branc et al. | 7,002,555 B1 | 2/2006 | Jacobsen et al. | |
| 6,429,856 B1 | 8/2002 | Omura et al. | 7,007,236 B2 | 2/2006 | Dempski et al. | |
| 6,429,857 B1 | 8/2002 | Masters et al. | 7,015,418 B2 | 3/2006 | Cahill et al. | |
| 6,480,187 B1 | 11/2002 | Sano et al. | 7,030,861 B1 | 4/2006 | Westerman et al. | |
| 6,496,122 B2 | 12/2002 | Sampsell | 7,057,647 B1 | 6/2006 | Monroe | |
| 6,497,608 B2 | 12/2002 | Ho et al. | 7,058,204 B2 | 6/2006 | Hildreth et al. | |
| 6,498,602 B1 | 12/2002 | Ogawa | 7,075,054 B2 | 7/2006 | Iwamoto et al. | |
| 6,501,461 B2 | 12/2002 | Holtzman | 7,084,857 B2 | 8/2006 | Lieberman et al. | |
| 6,504,532 B1 | 1/2003 | Ogasahara et al. | 7,084,868 B2 | 8/2006 | Farag et al. | |
| 6,507,339 B1 | 1/2003 | Tanaka | 7,098,392 B2 | 8/2006 | Sitrick et al. | |
| 6,512,838 B1 | 1/2003 | Rafii et al. | 7,113,174 B1 | 9/2006 | Takekawa et al. | |
| 6,517,266 B2 | 2/2003 | Saund | 7,121,470 B2 | 10/2006 | McCall et al. | |
| 6,518,600 B1 | 2/2003 | Shaddock | 7,133,032 B2 * | 11/2006 | Cok | 345/175 |
| 6,518,960 B2 | 2/2003 | Omura et al. | 7,151,533 B2 | 12/2006 | Van Ieperen | |
| 6,522,830 B2 | 2/2003 | Yamagami | 7,176,904 B2 | 2/2007 | Satoh | |
| 6,529,189 B1 | 3/2003 | Colgan et al. | 7,184,030 B2 | 2/2007 | McCharles et al. | |
| 6,530,664 B2 | 3/2003 | Vanderwerf et al. | 7,187,489 B2 | 3/2007 | Miles | |
| 6,531,999 B1 | 3/2003 | Trajkovic | 7,190,496 B2 | 3/2007 | Klug et al. | |
| 6,532,006 B1 | 3/2003 | Takekawa et al. | 7,202,860 B2 | 4/2007 | Ogawa | |
| 6,537,673 B2 | 3/2003 | Sada et al. | 7,227,526 B2 | 6/2007 | Hildreth et al. | |
| 6,540,366 B2 | 4/2003 | Keenan et al. | 7,230,608 B2 | 6/2007 | Cok | |
| 6,540,679 B2 | 4/2003 | Slayton et al. | 7,232,986 B2 | 6/2007 | Worthington et al. | |
| 6,545,669 B1 | 4/2003 | Kinawi et al. | 7,236,132 B1 | 6/2007 | Lin et al. | |
| 6,559,813 B1 | 5/2003 | DeLuca et al. | 7,236,154 B1 | 6/2007 | Kerr et al. | |
| 6,563,491 B1 | 5/2003 | Omura | 7,236,162 B2 | 6/2007 | Morrison et al. | |
| 6,567,078 B2 | 5/2003 | Ogawa | 7,237,937 B2 | 7/2007 | Kawashima et al. | |
| 6,567,121 B1 | 5/2003 | Kuno | 7,242,388 B2 | 7/2007 | Lieberman et al. | |
| 6,570,103 B1 | 5/2003 | Saka et al. | 7,265,748 B2 | 9/2007 | Ryynanen | |
| 6,570,612 B1 | 5/2003 | Saund et al. | 7,268,692 B1 | 9/2007 | Lieberman | |
| 6,577,299 B1 | 6/2003 | Schiller et al. | 7,274,356 B2 | 9/2007 | Ung et al. | |
| 6,587,099 B2 | 7/2003 | Takekawa | 7,283,126 B2 | 10/2007 | Leung | |
| 6,590,568 B1 | 7/2003 | Astala et al. | 7,283,128 B2 | 10/2007 | Sato | |
| 6,594,023 B1 | 7/2003 | Omura et al. | 7,289,113 B2 | 10/2007 | Martin | |
| 6,597,348 B1 | 7/2003 | Yamazaki et al. | 7,302,156 B1 | 11/2007 | Lieberman et al. | |
| 6,597,508 B2 | 7/2003 | Seino et al. | 7,305,368 B2 | 12/2007 | Lieberman et al. | |
| 6,603,867 B1 | 8/2003 | Sugino et al. | 7,330,184 B2 | 2/2008 | Leung | |
| 6,608,619 B2 | 8/2003 | Omura et al. | 7,333,094 B2 | 2/2008 | Lieberman et al. | |
| 6,614,422 B1 | 9/2003 | Rafii et al. | 7,333,095 B1 | 2/2008 | Lieberman et al. | |
| 6,624,833 B1 | 9/2003 | Kumar et al. | 7,355,593 B2 | 4/2008 | Hill et al. | |
| 6,626,718 B2 | 9/2003 | Hiroki | 7,372,456 B2 | 5/2008 | McLintock | |
| 6,630,922 B2 | 10/2003 | Fishkin et al. | 7,375,720 B2 | 5/2008 | Tanaka | |
| 6,633,328 B1 | 10/2003 | Byrd et al. | RE40,368 E | 6/2008 | Arnon | |
| 6,650,318 B1 | 11/2003 | Arnon | 7,411,575 B2 | 8/2008 | Hill et al. | |
| 6,650,822 B1 | 11/2003 | Zhou | 7,414,617 B2 | 8/2008 | Ogawa | |
| 6,664,952 B2 | 12/2003 | Iwamoto et al. | 7,432,914 B2 | 10/2008 | Kobayashi et al. | |
| 6,670,985 B2 | 12/2003 | Karube et al. | 7,460,110 B2 | 12/2008 | Ung et al. | |
| 6,674,424 B1 | 1/2004 | Fujioka | 7,477,241 B2 | 1/2009 | Lieberman et al. | |
| 6,683,584 B2 | 1/2004 | Ronzani et al. | 7,479,949 B2 | 1/2009 | Jobs et al. | |
| 6,690,357 B1 | 2/2004 | Dunton et al. | 7,492,357 B2 | 2/2009 | Morrison et al. | |
| 6,690,363 B2 | 2/2004 | Newton | 7,499,037 B2 | 3/2009 | Lube | |
| 6,690,397 B1 | 2/2004 | Daignault, Jr. | 7,515,138 B2 | 4/2009 | Sullivan | |
| 6,710,770 B2 | 3/2004 | Tomasi et al. | 7,515,141 B2 | 4/2009 | Kobayashi | |
| 6,714,311 B2 | 3/2004 | Hashimoto | 7,522,156 B2 | 4/2009 | Sano et al. | |
| 6,720,949 B1 | 4/2004 | Pryor et al. | 7,538,759 B2 | 5/2009 | Newton | |
| 6,727,885 B1 | 4/2004 | Ishino et al. | 7,557,935 B2 | 7/2009 | Baruch | |
| 6,736,321 B2 | 5/2004 | Tsikos et al. | 7,559,664 B1 | 7/2009 | Walleman et al. | |

| | | |
|---|---|---|
| 7,619,617 B2 | 11/2009 | Morrison et al. |
| 7,629,967 B2 | 12/2009 | Newton |
| 7,692,625 B2 | 4/2010 | Morrison et al. |
| 7,751,671 B1 | 7/2010 | Newton et al. |
| 7,755,613 B2 | 7/2010 | Morrison et al. |
| 7,777,732 B2 | 8/2010 | Herz et al. |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1* | 12/2001 | Sano et al. .................... 345/175 |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0034439 A1 | 2/2003 | Reime et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0218297 A1 | 10/2005 | Suda et al. |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 | 2/2006 | Keely et al. |
| 2006/0034486 A1 | 2/2006 | Morrison et al. |
| 2006/0070187 A1 | 4/2006 | Chilson |
| 2006/0132432 A1 | 6/2006 | Bell |
| 2006/0139314 A1* | 6/2006 | Bell ............................ 345/156 |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 | 10/2006 | Tanaka et al. |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 | 12/2006 | Rekimoto |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 | 6/2007 | Chen et al. |
| 2007/0139932 A1 | 6/2007 | Sun et al. |
| 2007/0152977 A1 | 7/2007 | Ng et al. |
| 2007/0152984 A1 | 7/2007 | Ording et al. |
| 2007/0152986 A1 | 7/2007 | Ogawa |
| 2007/0160362 A1 | 7/2007 | Mitsuo et al. |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0215451 A1 | 9/2007 | Sasloff et al. |
| 2007/0236454 A1 | 10/2007 | Ung et al. |
| 2007/0247435 A1 | 10/2007 | Benko et al. |
| 2007/0273842 A1 | 11/2007 | Morrison et al. |
| 2008/0012835 A1 | 1/2008 | Rimon et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0143682 A1 | 6/2008 | Shim et al. |
| 2008/0150913 A1 | 6/2008 | Bell et al. |
| 2008/0158170 A1 | 7/2008 | Herz et al. |
| 2008/0259050 A1 | 10/2008 | Lin et al. |
| 2008/0259052 A1 | 10/2008 | Lin et al. |
| 2008/0259053 A1 | 10/2008 | Newton |
| 2009/0030853 A1 | 1/2009 | De La Motte |
| 2009/0058832 A1 | 3/2009 | Newton |
| 2009/0058833 A1 | 3/2009 | Newton |
| 2009/0077504 A1 | 3/2009 | Bell et al. |
| 2009/0122027 A1 | 5/2009 | Newton |
| 2009/0135162 A1 | 5/2009 | Van De Wijdeven et al. |
| 2009/0141002 A1 | 6/2009 | Sohn et al. |
| 2009/0146972 A1 | 6/2009 | Morrison et al. |
| 2009/0207144 A1 | 8/2009 | Bridger |
| 2009/0213093 A1 | 8/2009 | Bridger |
| 2009/0213094 A1 | 8/2009 | Bridger |
| 2009/0219256 A1 | 9/2009 | Newton |

| | | | | | | |
|---|---|---|---|---|---|---|
| 2009/0237376 | A1 | 9/2009 | Bridger | DE | 60124549 | 9/2007 |
| 2009/0278816 | A1 | 11/2009 | Colson | DE | 102007021537 | 6/2008 |
| 2009/0284495 | A1 | 11/2009 | Geaghan et al. | EP | 0125068 | 11/1984 |
| 2009/0295755 | A1 | 12/2009 | Chapman et al. | EP | 0181196 | 5/1986 |
| 2009/0309844 | A1 | 12/2009 | Woo et al. | EP | 0279652 | 8/1988 |
| 2009/0309853 | A1 | 12/2009 | Hildebrandt et al. | EP | 0347725 | 12/1989 |
| 2010/0009098 | A1 | 1/2010 | Bai et al. | EP | 0420335 | 4/1991 |
| 2010/0045629 | A1 | 2/2010 | Newton | EP | 0657841 | 6/1995 |
| 2010/0045634 | A1 | 2/2010 | Su et al. | EP | 0762319 | 3/1997 |
| 2010/0079412 | A1 | 4/2010 | Chiang et al. | EP | 0829798 | 3/1998 |
| 2010/0085330 | A1 | 4/2010 | Newton | EP | 0843202 | 5/1998 |
| 2010/0090985 | A1 | 4/2010 | Newton | EP | 0897161 | 2/1999 |
| 2010/0090987 | A1 | 4/2010 | Lin et al. | EP | 0911721 | 4/1999 |
| 2010/0097353 | A1 | 4/2010 | Newton | EP | 1059605 | 12/2000 |
| 2010/0103143 | A1 | 4/2010 | Newton et al. | EP | 1262909 | 12/2002 |
| 2010/0177052 | A1 | 7/2010 | Chang et al. | EP | 1297488 | 4/2003 |
| 2010/0182279 | A1 | 7/2010 | Juni | EP | 1420335 | 5/2004 |
| 2010/0193259 | A1 | 8/2010 | Wassvik | EP | 1450243 | 8/2004 |
| 2010/0207911 | A1 | 8/2010 | Newton | EP | 1457870 | 9/2004 |
| 2010/0225588 | A1 | 9/2010 | Newton et al. | EP | 1471459 | 10/2004 |
| 2010/0229090 | A1 | 9/2010 | Newton et al. | EP | 1517228 | 3/2005 |
| 2010/0315379 | A1 | 12/2010 | Allard et al. | EP | 1550940 | 7/2005 |
| 2011/0019204 | A1 | 1/2011 | Bridger | EP | 1577745 | 9/2005 |
| 2011/0050649 | A1 | 3/2011 | Newton et al. | EP | 1599789 | 11/2005 |
| 2011/0176082 | A1 | 7/2011 | Allard et al. | EP | 1611503 | 1/2006 |
| 2011/0199335 | A1 | 8/2011 | Li et al. | EP | 1674977 | 6/2006 |
| 2011/0199387 | A1 | 8/2011 | Newton | EP | 1736856 | 12/2006 |
| 2011/0205151 | A1 | 8/2011 | Newton et al. | EP | 1739528 | 1/2007 |
| 2011/0205155 | A1 | 8/2011 | Newton et al. | EP | 1739529 | 1/2007 |
| 2011/0205185 | A1 | 8/2011 | Newton et al. | EP | 1741186 | 1/2007 |
| 2011/0205186 | A1 | 8/2011 | Newton et al. | EP | 1759378 | 3/2007 |
| 2011/0205189 | A1 | 8/2011 | Newton | EP | 1766501 | 3/2007 |
| 2011/0221666 | A1 | 9/2011 | Newton et al. | EP | 1830248 | 9/2007 |
| 2011/0234542 | A1 | 9/2011 | Marson | EP | 1877893 | 1/2008 |
| | | | | EP | 2135155 | 12/2009 |
| | FOREIGN PATENT DOCUMENTS | | | EP | 2195726 | 6/2010 |
| | | | | EP | 2250546 | 11/2010 |
| AU | 2004211738 | | 8/2004 | ES | 2279823 | 9/2007 |
| AU | 2006243730 | | 11/2006 | FR | 2521330 | 8/1983 |
| CA | 2058219 | | 4/1993 | GB | 1575420 | 9/1980 |
| CA | 2367864 | | 4/1993 | GB | 2176282 | 5/1986 |
| CA | 2219886 | | 4/1999 | GB | 2176282 | 12/1986 |
| CA | 2251221 | | 4/1999 | GB | 2204126 | 11/1988 |
| CA | 2267733 | | 10/1999 | GB | 2263765 | 8/1993 |
| CA | 2268208 | | 10/1999 | JP | 57211637 | 12/1982 |
| CA | 2252302 | | 4/2000 | JP | 58146928 | 9/1983 |
| CA | 2412878 | | 1/2002 | JP | 61196317 | 8/1986 |
| CA | 2341918 | | 9/2002 | JP | 61260322 | 11/1986 |
| CA | 2350152 | | 12/2002 | JP | 62-005428 | 1/1987 |
| CA | 2386094 | | 12/2002 | JP | 62005428 | 1/1987 |
| CA | 2372868 | | 8/2003 | JP | 63223819 | 9/1988 |
| CA | 2390503 | | 12/2003 | JP | 1061736 | 3/1989 |
| CA | 2390506 | | 12/2003 | JP | 1154421 | 6/1989 |
| CA | 2432770 | | 12/2003 | JP | 3054618 | 3/1991 |
| CA | 2493236 | | 12/2003 | JP | 3244017 | 10/1991 |
| CA | 2448603 | | 5/2004 | JP | 4350715 | 12/1992 |
| CA | 2453873 | | 7/2004 | JP | 4355815 | 12/1992 |
| CA | 2460449 | | 9/2004 | JP | 5181605 | 7/1993 |
| CA | 2521418 | | 10/2004 | JP | 5189137 | 7/1993 |
| CA | 2481396 | | 3/2005 | JP | 5197810 | 8/1993 |
| CA | 2491582 | | 7/2005 | JP | 6110608 | 4/1994 |
| CA | 2563566 | | 11/2005 | JP | 7110733 | 4/1995 |
| CA | 2564262 | | 11/2005 | JP | 7160403 | 6/1995 |
| CA | 2501214 | | 9/2006 | JP | 7230352 | 8/1995 |
| CA | 2606863 | | 11/2006 | JP | 8016931 | 2/1996 |
| CA | 2580046 | | 9/2007 | JP | 8108689 | 4/1996 |
| CA | 2515955 | | 1/2011 | JP | 8506193 | 7/1996 |
| CN | 1277349 | | 12/2000 | JP | 8240407 | 9/1996 |
| CN | 1407506 | | 4/2003 | JP | 8315152 | 11/1996 |
| CN | 1440539 | | 9/2003 | JP | 9091094 | 4/1997 |
| CN | 1774692 | | 5/2006 | JP | 9224111 | 8/1997 |
| CN | 1784649 | | 6/2006 | JP | 9319501 | 12/1997 |
| CN | 1310126 | | 4/2007 | JP | 10031546 | 2/1998 |
| CN | 101019096 | | 8/2007 | JP | 10105324 | 4/1998 |
| CN | 101023582 | | 8/2007 | JP | 10162698 | 6/1998 |
| CN | 101663637 | | 3/2010 | JP | 10254623 | 9/1998 |
| CN | 101802759 | | 8/2010 | JP | 11045155 | 2/1999 |
| CN | 101802760 | | 8/2010 | JP | 11051644 | 2/1999 |
| DE | 3836429 | | 5/1990 | JP | 11064026 | 3/1999 |
| DE | 19810452 | | 12/1998 | | | |

| | | |
|---|---|---|
| JP | 11085376 | 3/1999 |
| JP | 11110116 | 4/1999 |
| JP | 11203042 | 7/1999 |
| JP | 11212692 | 8/1999 |
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 200365716 | 3/2003 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO-2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO-2005106775 | 11/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO-2007132033 | 11/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO-2008128096 | 10/2008 |
| WO | WO2008128096 | 10/2008 |
| WO | WO2009029764 | 3/2009 |
| WO | WO-2009029764 | 3/2009 |
| WO | WO2009029767 | 3/2009 |
| WO | WO-2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Co-pending U.S. Appl. No. 12/201,463, filed Aug. 29, 2008.
U.S. Appl. No. 12/201,410, Newton, John.
Benko, "Precise Selection Techniques for Multi-Touch Screens", Conference on Human Factors in Computing Systems—Proceedings 2006, vol. 2, 1263-1273.
Anon,."SMART Board Specifications Model 680i", XP7915047 Retrieved from the Internet: URL:http://www2.smarttech.com/kbdoc/74231 [retrieved on Sep. 23, 2010] the whole document, 2008; pp. 1-5.
Benko, et al., "Precise Selection Techniques for Multi-Touch Screens", *Conference on Human Factors in Computing Systems—Proceedings 2006*, 2: 1263-1273.
Buxton, et al., "Issues and Techniques in Touch-Sensitive Tablet Input", *Computer Graphics, Proceedings of SIGGRAPH'85*, 1985, 19(3): 215-223.
Canadian Patent Application No. 2412878, Office Action, mailed May 12, 2009, 4 pages.
"Composite List of Projects 1983 to 1989", *NASA Small Business Innovation Research Program*, Aug. 1990, 132 pages.
"Digital Vision Touch Technology", White Paper, *SMART Technologies Inc.*, Feb. 2003, 10 pages.
European Application No. 02253594.2, European Search Report, mailed Jan. 5, 2006, 3 pages.
European Application No. 03257166.3, Partial European Search Report, mailed May 29, 2006, 4 pages.
European Application No. 04251392.9, European Search Report, mailed Jan. 18, 2007, 3 pages.
European Application No. 04711522.5, Office Action, mailed Jun. 29, 2010, 8 pages.
European Application No. 04711522.5, Office Action, mailed Mar. 22, 2010, 1 page.
European Application No. 04711522.5, Supplementary European Search Report, mailed Mar. 3, 2010, 3 pages.
European Application No. 06019268.9, European Search Report and Search Opinion, mailed Nov. 24, 2006, 5 pages.
European Application No. 06019269.7, European Search Report and Search Opinion, mailed Nov. 23, 2006, 5 pages.
European Application No. 07250888.0, European Search Report and Search Opinion, mailed Jun. 22, 2007, 6 pages.
European Application No. 07701682.2, Supplementary European Search Report and Search Opinion, mailed Dec. 7, 2010, 10 pages.
European Application No. 08745663.8, Office Action, mailed Dec. 27, 2010, 13 pages.
European Application No. 08745663.8, Office Action, mailed Jul. 6, 2010, 6 pages.
Förstner, "On Estimating Rotations", *Institut für Photogrammetrie, Universität Bonn*, 12 pages.
Fukushige, et al., "Interactive 3D Pointing Device Using Mirror Reflections", *Graduate School of Engineering, Osaka University*, 2006, 231-235.
Funk, "CCDs in optical touch panels deliver high resolution", *Electronic Design*, Sep. 27, 1980, pp. 139-143.
Geer, "Will Gesture-Recognition Technology Point the Way?", *Industry Trends*, Oct. 2004, 20-23.

Hartley, "Multiple View Geometry in Computer Vision", *Cambridge University Press* First published 2000, Reprinted (with corrections) 2001, pp. 70-73, 92-93, and 98-99.

Heddier Electronic, "Store Window Presentations", Feb. 2, 2011, 2 pages.

Herot, et al., "One-Point Touch Input of Vector Information for Computer Displays", *Architecture Machine Group Massachusetts Institute of Technology* Cambridge, Massachusetts, Oct. 31, 1977, pp. 210-216.

Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.

Hu, et al., "Multiple-view 3-D Reconstruction Using a Mirror", *The University of Rochester*, May 2005, 14 pages.

International Application No. PCT/CA2001/00980, International Search Report, mailed Oct. 22, 2001, 3 pages.

International Application No. PCT/CA2004/001759, International Search Report and Written Opinion, mailed Feb. 21, 2005, 7 pages.

International Application No. PCT/CA2007/002184, International Search Report, mailed Mar. 13, 2008, 3 pages.

International Application No. PCT/CA2008/001350, International Search Report, mailed Oct. 17, 2008, 5 pages.

International Application No. PCT/CA2009/000733, International Search Report and Written Opinion, mailed Sep. 10, 2009, 6 pages.

International Application No. PCT/CA2010/001085, International Search Report, mailed Oct. 12, 2010, 4 pages.

International Application No. PCT/NZ2004/000029, International Preliminary Report on Patentability, issued May 20, 2005, 21 pages.

International Application No. PCT/NZ2004/000029, International Search Report and Written Opinion, mailed Jun. 10, 2004, 6 pages.

International Application No. PCT/NZ2005/000092, International Preliminary Report on Patentability, completed Dec. 30, 2006, 3 pages.

International Application No. PCT/NZ2005/000092, International Search Report, mailed Sep. 27, 2006, 4 pages.

International Application No. PCT/NZ2010/000049, International Search Report and Written Opinion, mailed Oct. 14, 2010, 12 pages.

International Application No. PCT/NZ2010/000051, International Search Report and Written Opinion, mailed Oct. 5, 2010, 15 pages.

International Application No. PCT/US2008/060102, International Preliminary Report on Patentability, mailed Oct. 22, 2009, 10 pages.

International Application No. PCT/US2008/060102, International Search Report and Written Opinion, mailed Feb. 12, 2009, 20 pages.

International Application No. PCT/US2008/074749, International Preliminary Report on Patentability, issuance Mar. 2, 2010, 9 pages.

International Application No. PCT/US2008/074749, International Search Report and Written Opinion, mailed Feb. 11, 2009, 15 pages.

International Application No. PCT/US2008/074755, International Preliminary Report on Patentability, issuance Mar. 2, 2010, 8 pages.

International Application No. PCT/US2008/074755, International Search Report and Written Opinion, mailed Jan. 29, 2009, 8 pages.

International Application No. PCT/US2009/030694, International Preliminary Report on Patentability, completion Apr. 26, 2010, 10 pages.

International Application No. PCT/US2009/030694, International Search Report, mailed Aug. 5, 2009, 5 pages.

International Application No. PCT/US2009/033624, International Preliminary Report on Patentability and Written Opinion, issuance Aug. 17, 2010, 6 pages.

International Application No. PCT/US2009/033624, International Search Report, mailed Mar. 29, 2010, 3 pages.

International Application No. PCT/US2009/042547, International Preliminary Report on Patentability, mailed Nov. 9, 2010, 6 pages.

International Application No. PCT/US2009/042547, International Search Report and Written Opinion, mailed Sep. 2, 2010, 12 pages.

International Application No. PCT/US2009/058682, International Search Report and Written Opinion, mailed Apr. 27, 2010, 15 pages.

International Application No. PCT/US2009/059193, International Search Report and Written Opinion, mailed Dec. 7, 2009, 15 pages.

International Application No. PCT/US2010/059050, International Search Report and Written Opinion, mailed Mar. 23, 2011, 9 pages.

International Application No. PCT/US2010/059104, International Search Report and Written Opinion, mailed Jun. 6, 2011, 14 pages.

International Application No. PCT/US2010/059078, International Search Report and Written Opinion, mailed Aug. 2, 2011, 17 pages.

"Introducing the NextWindow 1900 Optical Touch Screen", *A NextWindow White Paper, Next Window Human Touch*, May 22, 2007, 13 pages.

INTUIFACE Press Release, "IntuiLab introduces IntuiFace, an interactive table and its application platform", Nov. 30, 2007, 1 page.

INTUILAB, "Overview Page", Mar. 9, 2011, 1 page.

Japanese Patent Application No. 2005-000268, Office Action, mailed Jul. 5, 2010, Office Action—3 pages, English Translation—3 pages.

Japanese Patent Application No. 2006-502767, Office Action, mailed Jan. 20, 2009, Office Action—2 pages, English Translation—3 pages.

Japanese Patent Application No. 2006-502767, Office Action, mailed Jun. 22, 2010, Office Action—3 pages, English Translation—4 pages.

Japanese Patent Application No. 2007-511305, Office Action, mailed Feb. 1, 2011, Office Action—2 pages, English Translation—5 pages.

Japanese Patent Application No. 2007-511305, Office Action, mailed Sep. 6, 2011, Office Action—3 pages, English Translation—4 pages.

KANATANI, "Camera Calibration", *Geometric Computation for Machine Vision*, Oxford Engineering Science Series, 1993, 37(2): 56-63.

Korean Patent Application No. 10-2005-7014885, Office Action, dated Aug. 9, 2010, English Translation—5 pages.

Lane, et al., "Reflective Interaction in Virtual Environments", *Eurographics*, 2001, 20(3): 7 pages.

LO, "Solid-state image sensor: technologies and applications", SPIE Proceedings, 1998, 3422: 70-80.

Loinaz, et al., "A 200-mW, 3.3-V, CMOS Color Camera IC Producing 352 ×288 24-b Video at 30 Frames", *IEEE Journal of Solid-State Circuits*, Dec. 1998, 33(12); 2092-2103.

Piccardi, et al., "Background subtraction techniques: a review", *2004 IEEE International Conference on Systems, Man and Cybernetics*, Oct. 10, 2004, 4: 3099-3104.

POGUE, "The Multi-Touch Screen", *POGUE's Posts*, Mar. 27, 2007, 13 pages.

Singapore Patent Application No. 201001122-9, Office Action, dated May 3, 2011, 9 pages.

Tappert, et al., "On-Line Handwriting Recognition—A Survey", *Proceedings of the 9$^{th}$ International Conference on Pattern Recognition (ICPR)*, Rome, IEEE Computer Society Press, Nov. 14-17, 1988, 2: 1123-1132.

"ThruGlass™ Projected Capacitive Touchscreens Specifications", *Micro Touch*, 2000, 4 pages.

"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol. 5, Nos. 2-3.

"Touch Panel", *Veritas et Visus*, Nov. 2010, vol. 5, No. 4.

Photobit Corporation, "VGA-format CMOS Camera-on-a-Chip for Multimedia Applications", 1999, 2 pages.

Villamor, et al., "Touch Gesture Reference Guide", Last updated Apr. 15, 2010, 7 pages.

Wang, et al., "Stereo camera calibration without absolute world coordinate information", *SPIE*, Jun. 14, 1995, 2620: 655-662.

Wrobel, et al., "Minimum Solutions for Orientation", *Calibration and Orientation of Cameras in Computer Vision, Springer Series in Information Sciences*, 2001, 34: 28-33.

Office Action dated 2012 in related Chinese Application No. 200880105036.9, 10 pages. (No English translation available).

* cited by examiner

LOW PROFILE TOUCH PANEL SYSTEMS

PRIORITY CLAIM

This application claims priority to New Zealand Provisional Patent Application No. 561,038, filed on Aug. 30, 2007 and entitled OPTICAL TOUCHSCREEN ENABLING THIN CROSS SECTION, which is hereby incorporated by reference herein in its entirety.

TECHNICAL FIELD

The present subject matter generally pertains to touch display systems that allow a user to interact with one or more processing devices by touching on or near a surface.

BACKGROUND

Digitizers and tablets can be incorporated as a coordinate input apparatus in processing units. For instance, the digitizer or tablet can be used alongside one or more display devices (e.g. CRT, LCD, or other display technology) in a touch enabled display assembly. Generally speaking, various systems for detecting an angle (direction) or a position of an object relative to the display area can be used, such as pressure sensitive resistance membrane systems, capacitance systems, electromagnetic induction systems, and the like. As another example, optical systems capable of detecting the angle or the position of the object can be used.

More particularly, touch screen input devices include resistive, surface capacitive, surface acoustic wave (SAW), infrared (IR), Frustrated Total Internal Reflection (FTIR), Projected capacitive, optical and bending wave. Often, the foregoing touch screen devices (aside from some optical and infrared technologies) require use of a touch enabled transparent cover layer that adds height to the display assembly.

Certain optical and infrared systems rely on detection of light traveling in optical paths that lie in one or more detection planes in an area ("touch area" herein) above the touched surface. For example, optical imaging for touch screens can use a combination of line-scan or area image cameras, digital signal processing, front or back illumination, and algorithms to determine a point or area of touch. Components used to emit and detect light in the detection plane(s) can be positioned along one or more edges of the touch screen area as part of a bezel surrounding the touch screen area. Optical touch technology often uses line-scanning or area cameras orientated along one or more edges of the touch surface to image the bezel and track the movement of any object close to the surface of the touch screen by detecting the interruption of an infrared light source.

In some systems, the light can be emitted across the surface of the touch screen by IR-LED emitters aligned along the optical axis of the camera to detect the existence or non existence of light reflected by a retro-reflective border. If an object is interrupting light in the detection plane, the object will cast a shadow in the retroreflected light. Based on the direction of the shadow as cast toward multiple detectors and the spatial arrangement of the detectors, the object's location in the detection area can be triangulated. As another example, light can be emitted across the touch area in a grid pattern, with the object's location determined based on where the grid is interrupted.

Figure 1:
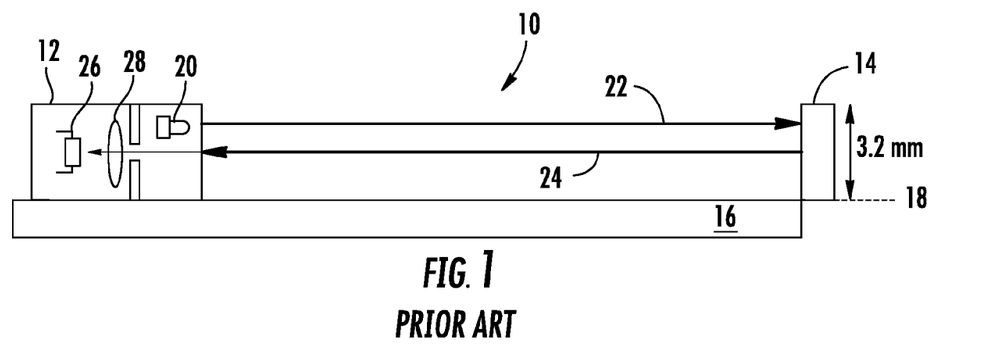
FIG. 1 is a diagram illustrating an exemplary prior art illumination and detection system which is positioned above a touch surface.

For instance, FIG. 1 is a cross-sectional view of an exemplary touch detection system 10 in which an optical detection and illumination system 12 and illuminated bezel 14 both extend above a touch surface 18. In this particular example, the optical detection system and illumination system are combined into a single unit as is known in the art. The plane of touch surface 18 in this example corresponds to the top of display screen 16 or a protective layer positioned above the display screen. Light is emitted from illumination source 20 and is directed along an outgoing optical path 20. The light is then retroreflected along return optical path 24, passing into optics 28 (a lens in this example) and detector 26. In this example, the profile of the touch detection system is 3.2 mm.

Figure 2:
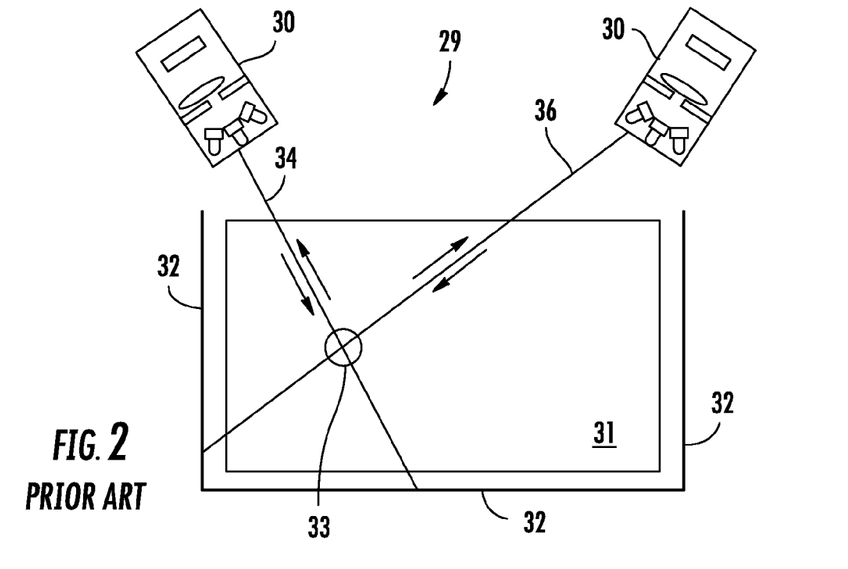
FIG. 2 is a diagram generally illustrating the triangulation principle employed in various prior art systems.

As is known to those of skill in the art, the triangulation principle can be used to calculate the position at which an object impinges on a detection plane via measurements from two or more detection systems. FIG. 2 provides a top view of an exemplary touch detection system 29 which can identify coordinates within a detection plane 31. In this example, two optical detection and illumination systems 30 are provided, with respective exemplary paths 34 and 36 showing the route of light emitted from and returned to the illumination/detection systems 30 via reflective components positioned along edges 32. For example, retroreflective components can be positioned along edges 32 covered by or included in a bezel.

When an object interrupts the beams as represented at 33, the location of the interruption can be triangulated based on the change in optical paths across detection plane 31. For example, an object may cast shadows which are detected by illumination/detection systems 30, with location 33 triangulated from the direction of the shadows and the known spatial relationship between illumination/detection systems 30.

Figure 3:
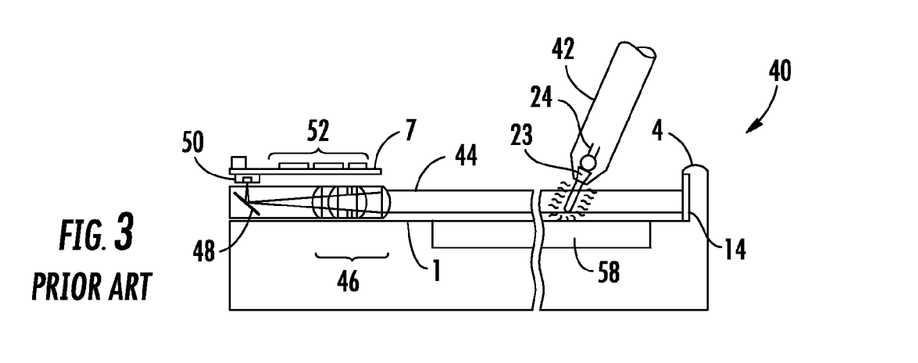
FIG. 3 is a diagram illustrating an optical touch system including detection components above the detection plane in another exemplary prior art system.

FIG. 3 shows a side view of another exemplary touch detection system 40. In this example, illuminated stylus 42 is used to intersect detection plane 44. Light traveling in detection plane 44 may be collected via optics 46 and directed via reflector 48 to detector 50. In this example, detector 50 is interfaced with detector electronics 52 mounted above the touch surface. For example, detector 50, electronics 52, lenses 46, and reflector 58 may all be built into a bezel surrounding screen 58.

The relative complexity of the optical components used to emit and detect light can lead to a profile height of the bezel that is not suitable for all applications. For example, the bezel height may be too large for use in a handheld computing device, such as a mobile phone, or personal digital assistant (PDA).

Figure 4:
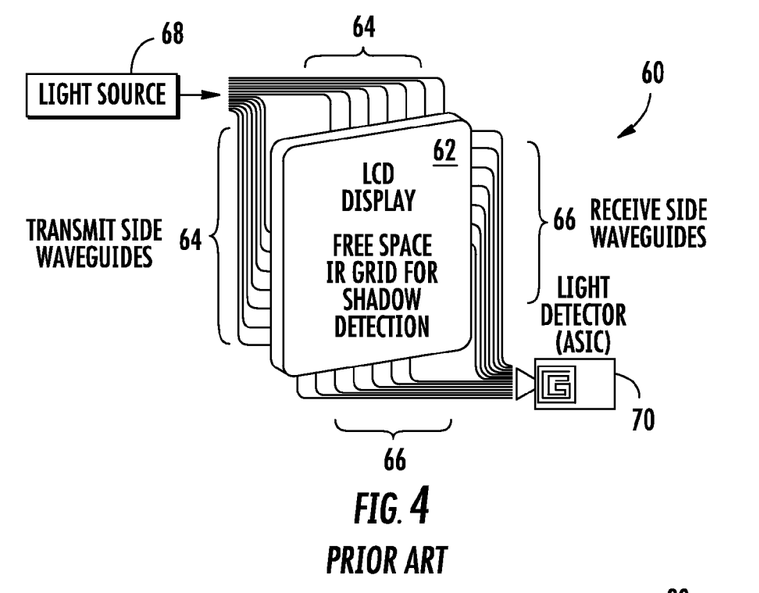
FIG. 4 generally illustrates one prior art solution in which illumination and detection components are positioned behind a touch surface through use of waveguide structures.

RPO Pty Ltd of Australia, attempts to provide a low profile by having the IR emitters and receivers optically connected by wave guides. In the example of FIG. 4, touch-enabled display 60 comprises an LCD display 62 surrounded by a plurality of transmit side waveguides 64 and receive side waveguides 66. Transmit side waveguides provide an optical path from light source 68, while receive side waveguides provide an optical path to detection electronics (ASIC) 70. Light from transmit side waveguides 64 forms a grid pattern across display 62 which can be detected by electronics 70. An object's location on the detection plane can be determined based on interruptions or other disruptions in the expected grid pattern. For example, source 68 may emit infrared or other light, and interruption of the grid may result in a shadow that diminishes the light received at one or more receive side waveguides 66.

Although waveguides 64 and 66 allow for source 68 and electronics 70 to be positioned below the screen surface, the waveguides add cost and complexity to the touch-enabled display. For example, the waveguides may be fragile and require careful handling. As another example, each of several waveguides must be connected to the touchscreen at one end and to electronics 70 at the other end. In short, use of the waveguides can complicate assembly and repair and may lead to a less durable product

SUMMARY

Objects and advantages of the present subject matter will be apparent to one of ordinary skill in the art upon careful review of the present disclosure and/or practice of one or more embodiments of the claimed subject matter.

In accordance with one or more aspects of the present subject matter, a low profile touch display can feature a touch surface corresponding to the outer surface of the display or a protective layer over the display. A reflective or refractive member at one or more edges of the touch surface can direct light traveling in one or more detection planes above the touch surface to the detection optics of the touch display via one or more pinhole apertures. The bulk of the electronics and optics of the optical detection system are positioned partially or completely below the plane of the touch surface, with only the refractive or reflective members and the exit and entry apertures for light extending above the touch surface. Consequently, the touch display system can have a thin cross section that is well suited for devices such as mobile phones, PDAs, and other portable computing devices for which minimal device thickness is a priority.

For example, a touch detection system can include an illuminated bezel positioned at an edge of a touch surface and configured to direct light along one or more optical paths laying in a detection plane (or planes) above the plane of the touch surface. The illuminated bezel may reflect, refract, or otherwise scatter light from one or more sources so that light is directed towards an optical detection system. As mentioned above, the touch surface may, for example, correspond to the surface of a display device or a protective surface (e.g. transparent or semi-transparent glass, plastic, or other material) positioned over the display device.

The touch detection system can further comprise an optical detection system positioned at an edge of the touch surface and partially or completely below the plane of the touch surface. The term "below" is meant to refer to the vertical positioning of the optical detection system relative to the plane of the touch surface and not necessarily its lateral position relative to the edges of the touch surface.

At one or more edges of the touch surface, the system can include an optical assembly extending above the plane of the touch surface so as to intersect with the detection plane(s), with the optical assembly configured to direct light from an optical path (or paths) laying in the detection plane into the detection system via a pinhole aperture.

In some embodiments, the illuminated bezel is illuminated by an illumination source positioned at least partially below the plane of the touch surface. The illumination source can be configured to direct light toward an optical assembly through a pinhole aperture and into an optical path lying in the detection plane.

The illumination source may be positioned alongside the detection components of the optical detection system in some implementations and provide illumination via the same optical assembly that receives light returned from the touch area, with the same optical assembly relaying light up to the detection plane from the source. In such embodiments, the illuminated bezel can reflect, refract, or otherwise scatter light towards the detection components.

However, in other embodiments, the illumination source may be located at a different location on an edge of the touch surface and direct light through a pinhole aperture having the same size as the first pinhole aperture. The pinhole aperture can lead to a second optical assembly positioned at an edge of the touch surface and extending above the plane of the touch surface so as to intersect with the detection plane. Light can be directed up into the second optical assembly, across the touch area, into the first optical assembly, and then into the optical detection system.

In certain embodiments, the optical assembly or assemblies extend above the plane of the touch surface by a height approximately equal to the diameter of the pinhole aperture(s). For example, if the pinhole aperture is circular, the diameter can refer to the diameter of the circle, or if the aperture is square, the diameter can refer to the diagonal of the square. More generally, the diameter can refer to the maximum distance across the opening measured along a line that passes through the opening. In some embodiments, the pinhole aperture diameter(s) can be equal to or approximately 0.5 mm, although other diameters could be used, as appropriate. As used herein, "approximately" is meant to convey that the value is within ±20% of the stated value, thus "approximately" 0.5 mm includes 0.5 mm±0.1 mm. Pinhole apertures can have other shapes in other embodiments.

The "plane of the touch surface" is used to refer generally to a plane extending through space that, within the touch area, corresponds to the top of the touch surface. For example, the top of the touch surface can correspond to the top of display screen or a protective layer positioned above the display screen in some embodiments.

Multiple detection systems can be used in some embodiments. For example, a second detection system can be positioned at an edge of the touch surface and configured to receive light directed toward the second detection system via a second pinhole aperture. Depending on the configuration of the touch detection system, a single optical assembly with appropriate characteristics can be used to route light to the respective detection systems, or each detection system can feature a separate corresponding optical assembly extending above the touch surface.

Some embodiments can include at least one computing device interfaced with the detection system or systems and configured to determine a location at which an object has intersected the detection plane based on data collected from the detection system(s). For example, location may be determined based on the object's disturbance of the propagation of light in the detection plane(s), such as by detecting variances in illumination intensity (e.g. illumination intensity increases and/or shadows). As one particular example, the "triangulation principle" may be used to determine an object's location relative to the touch surface area.

One or more display systems can be included, the display system(s) having a surface positioned parallel to or corresponding the touch surface. For example, an LCD or other type of display can comprise the touch surface. The display systems can, in some embodiments, be interfaced with the at least one computing device. Accordingly, the computing device(s), in conjunction with the touch detection system and displays, can provide a touch-enabled display for use in operating the computing device(s).

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components:

DETAILED DESCRIPTION

Reference will now be made in detail to various and alternative exemplary embodiments and to the accompanying drawings, with like numerals representing substantially identical structural elements. Each example is provided by way of explanation, and not as a limitation. It will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the instant disclosure includes modifications and variations as come within the scope of the appended claims and their equivalents.

Figure 5:
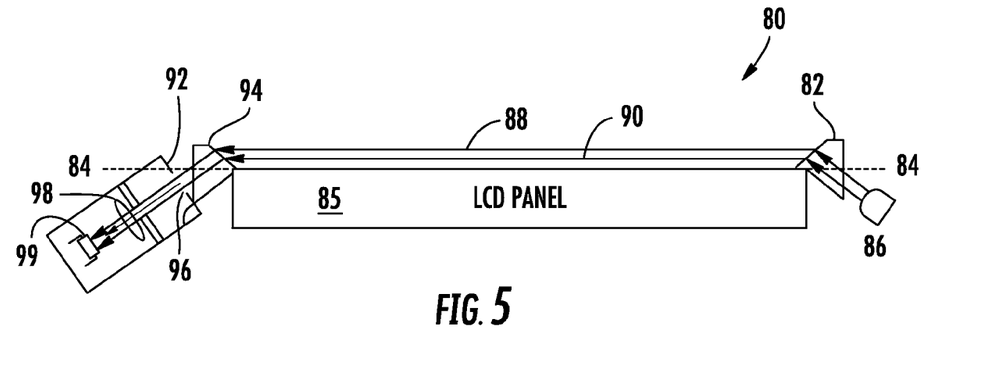
FIG. 5 is a diagram illustrating an exemplary low profile touch detection system according to some aspects of the present subject matter.

Turning now to FIG. 5, an exemplary touch detection system 80 configured in accordance with one or more aspects of the present subject matter is shown. In this example, an illuminated bezel 82 directs light from source 86 along optical paths 88 and 90 which lie in detection planes above touch surface 84. Bezel 82 can be illuminated in any suitable way as will be noted below. As illustrated, touch surface 84 intersects with the surface of display 85, which is a liquid crystal display (LD) panel. It will be understood that in some embodiments, touch surface 84 may be above the actual surface of a display, such as when a covering is included on the surface of the display.

Optical detection system 92 is operative to detect light traveling in optical paths such as 88 and 90. Optical detection system 92 in this example comprises lens 98, detector 99, and related electronics. For instance, detector 99 may comprise a CMOS or other suitable light detector interfaced with an ASIC or other suitable circuitry to filter or otherwise process the output of detector 99. Of course, any suitable detection technology appropriate for detecting light from source 86 can be used. Further, although lens 98 is shown in this example for purposes of clarity, more complex optics may be used, including additional lenses, filters, and/or other suitable components.

Figure 6:
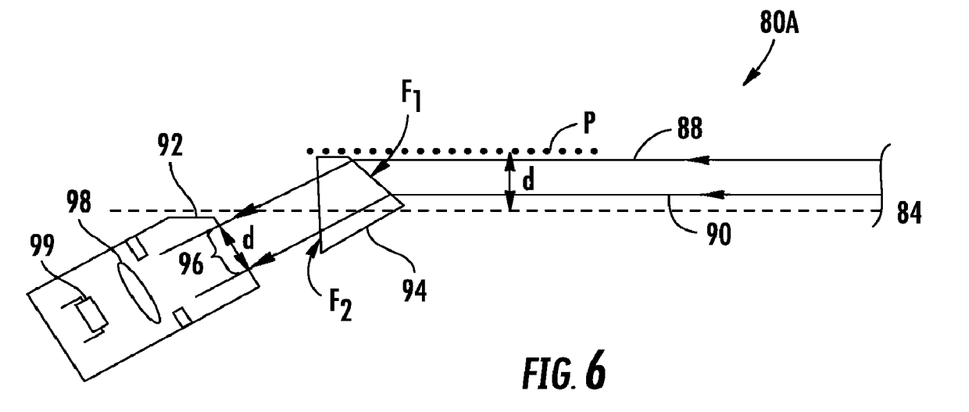
FIG. 6 shows a portion of the exemplary low profile touch detection system shown in FIG. 5 in closer detail.

Light traveling along optical paths 88 and 90 is directed into detection system 92 via a pinhole aperture 96 having a diameter d, which may be viewed in closer detail in FIG. 6. Although in this example pinhole aperture 96 is round and its size is expressed as a diameter in the traditional sense, it will be understood that pinhole apertures can have other shapes; in such cases, its diameter or size would refer to the length from one side to the other of the aperture, passing through the center.

Optical assembly 94 is positioned at an edge of touch surface 84 and acts to direct light from one or more detection planes towards pinhole aperture 96. Optical assembly 94 extends above touch surface 84 to a profile height P equal or approximately equal to the diameter d of pinhole aperture 96. For instance, diameter d (and thus the profile height of optical assembly 94) may be approximately 0.5 mm in some embodiments.

In example of FIGS. 5 and 6, optical assembly 94 is configured to direct light using refraction. Namely, a first facet F1 of the assembly 94 faces on the outside toward the touch detection area, while a second facet, F2, does not. Light entering facet F2 enters the assembly and is directed out of facet F1. Due to refraction the direction of light traveling from facet F2 to F1, and vice versa, is altered. Thus, optical detection system 92 can be positioned at least partially below the plane of touch surface 84.

In FIG. 5, optical detection system 92 is positioned outside the edges of touch surface 84 and partially below the plane of touch surface 84, while in FIG. 6 detection system 92 is depicted as entirely below the plane of touch surface 84. The relative distance between pinhole aperture 96 and optical assembly 94 can vary; in some embodiments, the aperture is minimally spaced from optical assembly 94.

Figure 7:
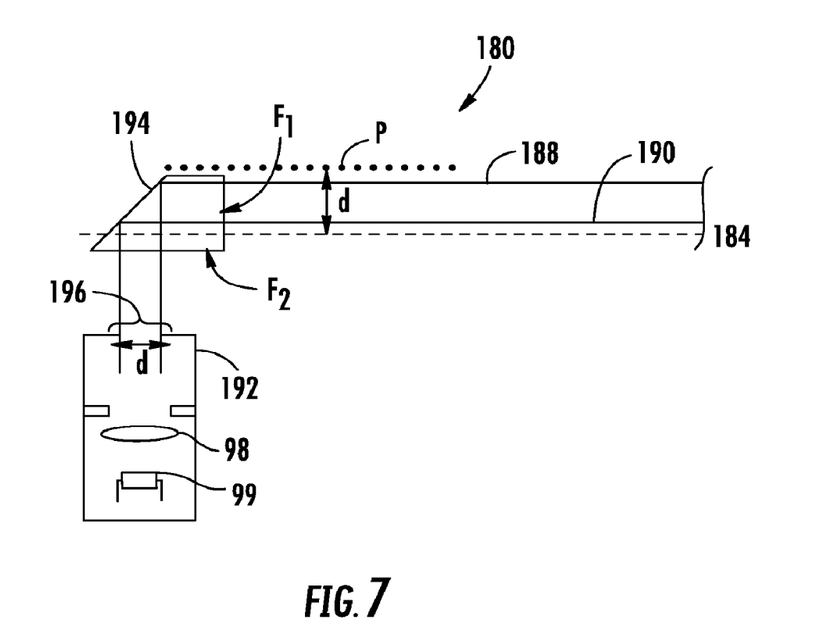
FIG. 7 shows a portion of another exemplary low profile touch detection system according to some aspects of the present subject matter.

FIG. 7 is an illustration of another exemplary touch detection system 180 as viewed in cross section. In this example, optical detection system 192 is positioned completely below touch surface 184. Similarly to system 92 in the examples of FIGS. 5-6, optical detection system 192 comprises a lens (198) and detector (199). In this example, optical assembly 194 comprises a first facet F1 facing toward the detection area and a second facet F2 partially facing away from the detection area. In this example, facet F2 is configured to reflect rays traveling in optical paths 88 and 90 downward through pinhole aperture 196. This facilitates placement of optical detector assembly 192 completely below touch surface 184. Optical assembly 194 extends above touch surface 184 to a profile height P equal or approximately equal to the diameter d of pinhole aperture 196. As noted above, in some embodiments, d is equal or approximately equal to 0.5 mm.

In any event, an optical assembly 82, 94, 194 can comprise any suitable material or materials. For instance, in some embodiments, polycarbonate or acrylic plastics can have suitable cost, durability, and clarity characteristics.

Figure 8:
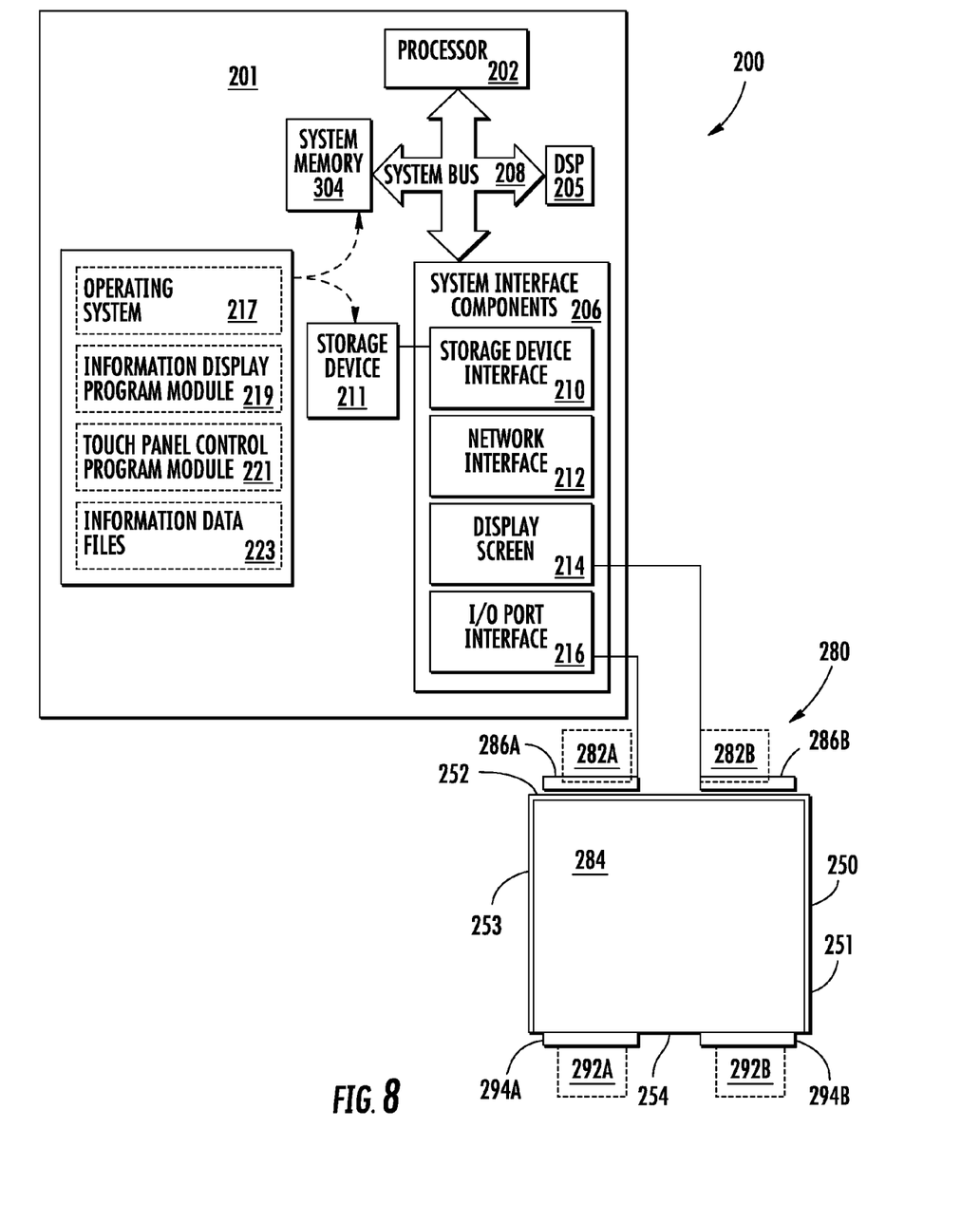
FIG. 8 is a block diagram illustrating an exemplary touch panel display system as interfaced with an exemplary computing device according to some aspects of the present subject matter.

FIG. 8 is a block diagram illustrating an exemplary touch detection system 280 as interfaced to an exemplary display 250 and a computing device 201 in accordance with certain aspects of the present subject matter. Computing device 201 may be functionally coupled to touch screen system 200, by hardwire and/or wireless connections. Computing device 201 may be any suitable computing device, including, but not limited to a processor-driven device such as a personal computer, a laptop computer, a handheld computer, a personal digital assistant (PDA), a digital and/or cellular telephone, a pager, a video game device, etc. These and other types of processor-driven devices will be apparent to those of skill in the art. As used in this discussion, the term "processor" can refer to any type of programmable logic device, including a microprocessor or any other type of similar device.

Computing device 201 may include, for example, a processor 202, a system memory 204, and various system interface components 206. The processor 202, system memory 204, a digital signal processing (DSP) unit 205 and system interface components 206 may be functionally connected via a system bus 208. The system interface components 206 may enable the processor 202 to communicate with peripheral devices. For example, a storage device interface 210 can provide an interface between the processor 202 and a storage device 211 (removable and/or non-removable), such as a disk drive. A network interface 212 may also be provided as an interface between the processor 202 and a network communications device (not shown), so that the computing device 201 can be connected to a network.

A display screen interface 214 can provide an interface between the processor 202 and display device 250. For instance, interface 214 may provide data in a suitable format for rendering by display device 250. Although not illustrated, computing device 201 may include additional components dictated by its intended function. For example, if computing device 201 comprises a cellular telephone, appropriate transmission and reception components may be included. As another example, computing device 201 may include networking components as noted above, such as a radio transmitter/receiver for communication using one or more wireless standards such as those governed by IEEE 802.11.

In this example, touch screen 250 is bounded by edges 251, 252, 253, and 254. For instance, a bezel may be used to protect the edges of screen 250. Further, the edges of touch surface 284 correspond to edges 251, 252, 253, and 254. As was noted above, touch surface 284 may correspond to the outer surface of display 250 or may correspond to the outer surface of a protective material positioned on display 250. Although in this example the touch screen is enabled to detect an object's position relative to the entire display area, in other embodiments, the system may be operative to detect an object's position relative to only a part of the display area.

In any event, FIG. 8 further illustrates a plurality of light sources 282A and 282B positioned at edge 252 and optical detection assemblies 292A and 292B positioned along edge 254. Since sources 282 and assemblies 292 are at least partially below touch surface 284, sources 282 and assemblies 292 are illustrated in phantom. In this example, optical assemblies 286A and 286B are shown along edge 252 for relaying light from sources 282 to optical paths in one or more detection planes above touch surface 284, while optical assemblies 294A and 294B are shown along edge 254 for relaying light from the detection plane(s) to detection assemblies 292.

One or more input/output ("I/O") port interfaces 216 may be provided as an interface between the processor 202 and various input and/or output devices. For example, the detection assemblies 292 or other suitable components of the touch screen system may be connected to the computing device 201 via an input port and may provide input signals to the processor 202 via an input port interface 216. Similarly, the light sources 282 of the touch screen system may be connected to the computing device 201 by way of an output port and may receive output signals (e.g. illumination timing and level controls) from the processor 202 via an output port interface 216.

A number of program modules may be stored in the system memory 204 and/or any other computer-readable media associated with the storage device 211 (e.g., a hard disk drive) or otherwise accessible by computing device 201. The program modules may include an operating system 217. The program modules may also include an information display program module 219 comprising computer-executable instructions for displaying images or other information on a display screen 250. Other aspects of the exemplary embodiments of the invention may be embodied in a touch screen control program module 221 for controlling the energy sources 282 and/or detector assemblies 292 and/or for calculating touch locations and discerning interaction states relative to the touch screen 250 based on signals received from the detector assemblies.

In some embodiments, a DSP unit is included for performing some or all of the functionality ascribed to the Touch Panel Control program module 221. As is known in the art, a DSP unit 205 may be configured to perform many types of calculations including filtering, data sampling, and triangulation and other calculations and to control the modulation and/or other characteristics of light sources 282. The DSP unit 205 may include a series of scanning imagers, digital filters, and comparators implemented in software. The DSP unit 205 may therefore be programmed for calculating touch locations and discerning other interaction characteristics as known in the art.

The processor 202, which may be controlled by the operating system 217, can be configured to execute the computer-executable instructions of the various program modules. Methods in accordance with one or more aspects of the present subject matter may be carried out due to execution of such instructions. Furthermore, the images or other information displayed by the information display program module 219 may be stored in one or more information data files 223, which may be stored on any computer readable medium associated with the computing device 201.

As discussed above, when a user touches on or near the touch screen 250, a variation will occur in the intensity of the energy beams that are directed across the surface of the touch screen in one or more detection planes. The detector assemblies 292 are configured to detect the intensity of the energy beams reflected or otherwise scattered across the surface of the touch screen 250 and should be sensitive enough to detect variations in such intensity. Information signals produced by the detector assemblies 292 and/or other components of the touch screen display system may be used by the computing device 201 to determine the location of the touch relative to the touch screen 250. Computing device 201 may also determine the appropriate response to a touch on or near touch screen 250.

In accordance with some implementations, data from the detector assemblies may be periodically processed by the computing device 201 to monitor the typical intensity level of the energy beams directed along the detection plane(s) when no touch is present. This allows the system to account for, and thereby reduce the effects of, changes in ambient light levels and other ambient conditions. Computing device 201 may optionally increase or decrease the intensity of the energy beams emitted by the light sources 282, as needed. Subsequently, if a variation in the intensity of the energy beams is detected by the detector assemblies, the computing device 201 can process this information to determine that a touch has occurred on or near the touch screen 250.

The location of a touch relative to the area of touch screen 250 may be determined, for example, by processing information received from each detector assembly 292 and performing one or more well-known triangulation calculations. By way of illustration, the computing device 201 may receive information from each detector assembly 292 that can be used to identify the position of an area of increased or decreased energy beam intensity relative to each detector assembly. The location of the area of decreased energy beam intensity relative to each detector assembly may be determined in relation to the coordinates of one or more pixels, or virtual pixels, of screen 250. The location of the area of increased or decreased energy beam intensity relative to each detector may then be triangulated, based on the geometry between the detector assemblies 292 to determine the actual location of the touch relative to the touch screen 250.

Any such calculations to determine touch location and/or interaction state can include algorithms to compensate for discrepancies (e.g., lens distortions, ambient conditions, damage to or impediments on the touch screen 100 or other touched surface, etc.), as applicable.

The locations and number of illumination sources 282, optical assemblies 286 and 294, and detector assemblies 292 in FIG. 8 are for purposes of example only. For instance, more or fewer illumination sources 282 and corresponding optical assemblies 286 could be used. Similarly more or fewer detector assemblies 292 and corresponding optical assemblies 294 could be used.

For example, rather than using triangulation, the system may establish a grid across the display surface using a plurality of illumination pinhole apertures and corresponding receiving pinhole apertures configured to direct light down to optical detection assemblies. For good resolution, several illumination sources and corresponding detection assemblies could be used.

In some embodiments, rather than discrete optical assemblies 294A and 294B, a continuous optical assembly can be provided along an edge, with the detector assemblies 292 and corresponding pinhole apertures located along the edge at different locations. Similarly, a continuous optical assembly 286 could be used in conjunction with multiple sources 282.

In certain embodiments, optical units comprising both detector assemblies and illumination sources are used. For instance, a detector assembly can include illumination sources that illuminate a retroreflector that returns the light to its point of origin. See, for instance, U.S. Pat. No. 6,362,468. In such embodiments, the same optical assembly and pinhole aperture could be used to route light from the illumination sources and across the detection plane and also return retroreflected light.

The above examples referred to various illumination sources and it should be understood that any suitable radiation source can be used. For instance, light emitting diodes (LEDs) may be used to generate infrared (IR) radiation that is directed over one or more optical paths in the detection plane. However, other portions of the EM spectrum or even other types of energy may be used as applicable with appropriate sources, detection systems, and optical (or other) units that redirect the energy to and from the detection plane.

Several of the above examples were presented in the context of a touch-enabled display. However, it will be understood that the principles disclosed herein could be applied even in the absence of a display screen when the position of an object relative to an area is to be tracked.

The various systems discussed herein are not limited to any particular hardware architecture or configuration. As was noted above, a computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art

What is claimed:

1. A touch detection system comprising:
   an illumination source positioned at least partially below a plane of a touch surface and configured to direct light in a first optical path;
   an optical detection system positioned at an edge of the touch surface and positioned partially above and partially below the plane of the touch surface; and
   an optical assembly positioned at the edge of the touch surface and extending above the plane of the touch surface so as to intersect with a detection plane above the plane of the touch surface, the optical assembly configured to reflect or refract light from the first optical path laving in the detection plane to a second optical path into the optical detection system via a pinhole; aperture, the second optical path being non-parallel to the first optical path;
   wherein the optical assembly defines a profile height above the plane of the touch surface, the profile height approximately equal to the diameter of the pinhole aperture.

2. The touch detection system set forth in claim 1, wherein the profile height is equal to the diameter of the pinhole aperture.

3. The touch detection system set forth in claim 1, wherein the profile height is less than 1 mm.

4. The touch detection system set forth in claim 3, wherein the pinhole aperture diameter is less than or equal to 0.5 mm.

5. The touch detection system set forth in claim 1, further comprising:
   a bezel at the edge of the touch surface, the bezel comprising a surface that reflects light from the first optical path laying in the detection plane back to the optical assembly.

6. The touch detection system set forth in claim 1, further comprising:
an illuminated bezel at an edge of the touch surface, the illuminated bezel comprising a second optical assembly positioned at the edge of the touch surface and extending above the plane of the touch surface so as to intersect with the detection plane;
wherein the illumination source is configured to direct light toward the second optical assembly and the second optical assembly is configured to reflect or refract light received from the illumination source into the first optical path laying the detection plane.

7. The touch detection system set forth in claim 6, wherein the second optical assembly defines a second profile height approximately equal to the size of the pinhole aperture.

8. The touch detection system set forth in claim 1, further comprising:
at least a second optical detection system, the second optical detection system positioned at the edge of the touch surface and configured to receive light directed toward the second detection system via another pinhole aperture; and
at least one computing device interfaced with the first and second optical detection systems and configured to determine a location at which an object has intersected the detection plane based on data collected from the optical detection systems.

9. The touch detection system set forth in claim 1, further comprising a display system having a top surface positioned parallel to or corresponding to the touch surface.

10. A touch detection system comprising:
an illuminated bezel positioned at an edge of a touch surface and configured to direct light along a first optical path laying in a detection plane above a plane of the touch surface;
a plurality of detection systems positioned along the edge of the touch surface and positioned partially above and partially below the plane of the touch surface; and
at least one optical assembly positioned at the edge of the touch surface and extending above the plane of the touch surface so as to intersect with the detection plane, the optical assembly configured to direct light from the first optical path laying in the detection plane to a second optical path into the respective detection systems via a plurality of pinhole apertures, each of the plurality of the pinhole apertures corresponding to a respective detection system, the second optical path being non-parallel to the first optical path;
wherein the optical assembly extends above the touch surface by a height approximately equal to the diameter of the plurality of pinhole apertures.

11. The touch detection system set forth in claim 10, further comprising an illumination source positioned at least partially below the touch surface and configured to direct light via the illuminated bezel toward the optical assembly through at least one of the pinhole apertures; and wherein the illuminated bezel comprises a surface that reflects light from the first optical path laying in the detection plane to the second optical path.

12. The touch detection system set forth in claim 10, further comprising an illumination source positioned at least partially below the plane of the touch surface;
wherein the illuminated bezel comprises a second optical assembly positioned at the edge of the touch surface and extending above the plane of the touch surface so as to intersect with the detection plane; and
wherein the illumination source is configured to direct light toward the second optical assembly and the second optical assembly is configured to direct light received from the illumination source into the first optical path laying in the detection plane.

13. The touch detection system set forth in claim 10, wherein the diameter of each pinhole aperture is less than or equal to 0.5 mm.

14. The touch detection system set forth in claim 10, further comprising:
at least one computing device interfaced with the detection systems and configured to determine a location at which an object has intersected the detection plane based on data collected from the detection systems.

15. The touch detection system set forth in claim 14, further comprising a display system having a surface positioned parallel to or corresponding to the touch surface, the display system interfaced with the at least one computing device.

16. A touch-enabled display device, comprising:
a display screen having a touch surface and an area;
a detection system, with a portion of the detection system positioned vertically above the touch surface and a portion of the detection system positioned vertically below the touch surface;
an illumination system, with at least a portion of the illumination system positioned vertically below the touch surface;
a computing device configured to determine the location at which an object has changed the transmission of light across the touch surface, the touch surface being coextensive with at least a part of the area of the display screen; and
at least one optical assembly positioned along at least one edge of the screen, the at least one optical assembly comprising a first facet that faces toward the interior of the touch surface and a second facet that does not face toward the interior of the touch surface;
wherein the at least one optical assembly is configured so that light entering the optical assembly at the first facet is directed to exit the optical assembly at the second facet and light entering the optical assembly at the second facet is directed to exit the optical assembly at the first facet;
wherein the display device is configured so that light is emitted from the illumination system and is directed into the second facet of the at least one optical assembly before crossing the touch surface.

17. The touch-enabled display device set forth in claim 16, wherein the at least one optical assembly comprises a first optical assembly and a second optical assembly and wherein the display device is configured so that:
the illumination system and detection system are separate from one another;
light is emitted from the illumination system into the first optical assembly, crosses the touch surface, and enters the second optical assembly which directs the light into the detection system via a pinhole aperture; and
the second optical assembly is separate from the detection system.

18. The touch-enabled display device set forth in claim 16, wherein the at least one optical assembly is configured to direct light by reflection.

19. The touch-enabled display device set forth in claim 16, wherein the at least one optical assembly is configured to direct light by refracting light at the first facet.

20. The touch-enabled display device set forth in claim 16, wherein the at least one optical assembly is configured so that: light traveling in the first optical path in a plane parallel to the plane of the touch surface and intersecting with the first facet is directed by the at least one optical assembly to travel in the second optical path in a plane that is not parallel to the plane of the touch surface and intersecting with the second facet.

* * * * *